(12) United States Patent
Garner

(10) Patent No.: US 9,884,734 B1
(45) Date of Patent: Feb. 6, 2018

(54) APPARATUS AND METHOD FOR THE INTERMODAL DISTRIBUTION OF FREIGHT

(71) Applicant: Garner Green CO2 Inc., Toronto (CA)

(72) Inventor: Hilary Paige Garner, Toronto (CA)

(73) Assignee: GARNER GREEN CO2 INC., Toronto, ON (CA)

( * ) Notice: Subject to any disclaimer, the term of this patent is extended or adjusted under 35 U.S.C. 154(b) by 689 days.

(21) Appl. No.: 14/207,792

(22) Filed: Mar. 13, 2014

Related U.S. Application Data

(60) Provisional application No. 61/788,805, filed on Mar. 15, 2013.

(51) Int. Cl.
*B65G 67/04* (2006.01)
*B65G 63/00* (2006.01)
*B65G 67/02* (2006.01)

(52) U.S. Cl.
CPC ........... *B65G 63/002* (2013.01); *B65G 67/02* (2013.01)

(58) Field of Classification Search
CPC .... B65G 63/02; B65G 63/022; B65G 63/002; B65G 63/00; B65G 63/004; B65G 63/025; B65G 7/02; B65G 7/00; B65G 7/04
USPC ........................................ 414/340, 341, 344
See application file for complete search history.

(56) References Cited

U.S. PATENT DOCUMENTS

| | | | | |
|---|---|---|---|---|
| 3,834,562 A | * | 9/1974 | Norrie .................. | B65G 69/008 14/71.3 |
| 6,179,535 B1 | * | 1/2001 | Bouchard .................. | B60J 5/08 296/24.4 |
| 7,454,811 B1 | * | 11/2008 | Stotka .................... | B65G 69/30 14/69.5 |
| 8,702,366 B2 | * | 4/2014 | Campbell ............ | B65G 63/002 410/92 |

* cited by examiner

*Primary Examiner* — Anna M Momper
*Assistant Examiner* — Mark C Hageman
(74) *Attorney, Agent, or Firm* — Millman IP Inc.

(57) ABSTRACT

A method of distributing freight between an intermodal shipping container and the freight containers of one or more surface-road transports, comprising the steps of: providing a freight container of at least a first surface-road transport; providing a first intermodal shipping container containing freight having a collective weight in excess of the maximum weight that can be lawfully carried in the freight container of each surface-road transport; providing a selectively moveable cross-dock having a body defining an interior storage area and at least first and second openings in the body through which freight may be moved into and out of the interior storage area; positioning a loading/unloading opening of the first intermodal shipping container proximate one of the openings in the cross-dock; positioning a loading/unloading opening of the freight container proximate the other opening in the cross-dock; and distributing freight between the intermodal shipping container and the freight container via cross-dock, the distribution step not continuing beyond the point at which the collective weight of all freight in each freight container would cause each surface road transport to exceed the maximum lawful surface-road transportation weight.

11 Claims, 16 Drawing Sheets

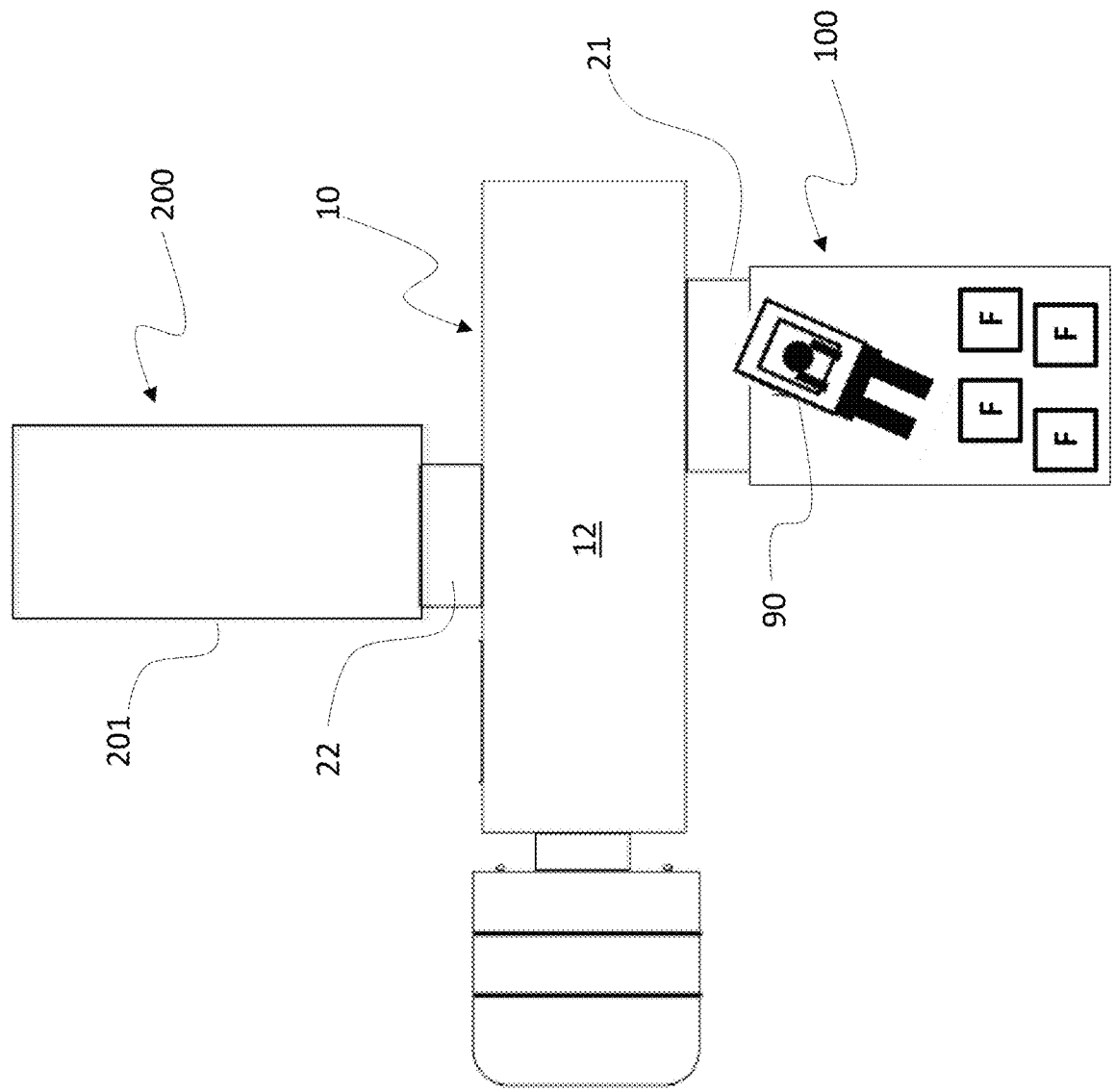

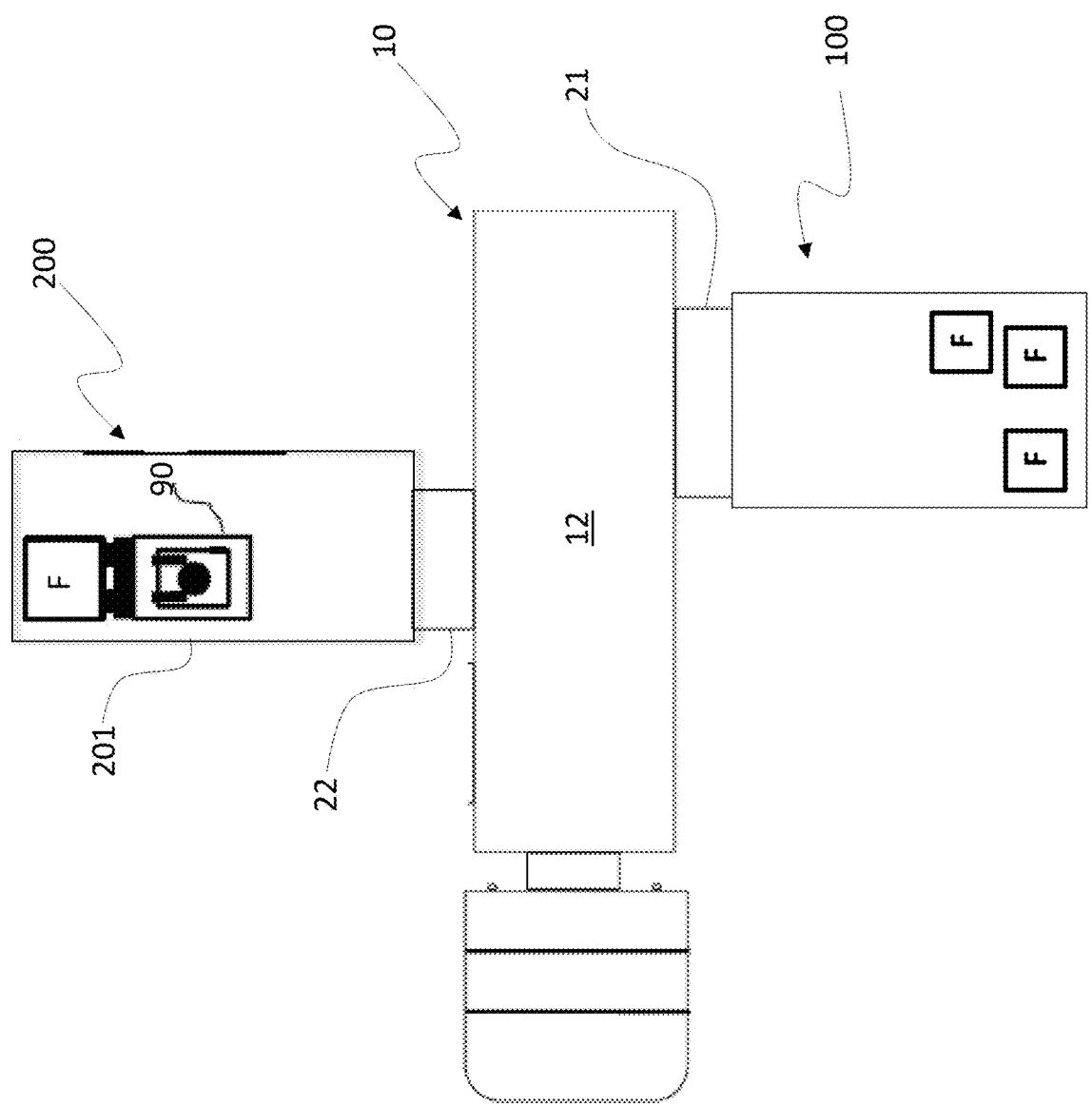

APPARATUS AND METHOD FOR THE INTERMODAL DISTRIBUTION OF FREIGHT

CROSS-REFERENCE TO RELATED APPLICATIONS

This application is related to, and claims the benefit of priority from, U.S. Provisional Application Ser. No. 61/788,805 filed 15 Mar. 2013, the disclosure of which is incorporated herein by reference in its entirety.

FIELD OF THE INVENTION

The invention relates generally to the intermodal transportation of freight and, more particularly, to an apparatus and method for maximizing efficiencies in intermodal freight transportation.

BACKGROUND

From the rapid expansion of railways in the late nineteenth century up until the mid-twentieth century, rail was the predominate method of overland transportation for freight in North America. The post-Second World War construction of an extensive network of high-speed highways transitioned substantial amounts of freight movement to trucking, and trucking has dominated as a transportation method for many categories of freight until the present. In recent years, however, a number of factors have had a negative effect on long distance trucking. First, as fuel costs have risen, the cost advantage has shifted to rail, which uses up to 70% less fuel per ton-mile. Secondly, because of the need to be away from home for several days at a time, younger drivers are not being attracted to these jobs and the age profile of truck drivers is steadily increasing. Together with the physical demands of the job, competitive pressure to exceed legally-imposed limits on daily driving hours and safety issues after driving many hours, labor shortages are beginning to appear. Finally, a recent trend toward state legislation imposing large fines for excessive carbon and particulate emissions, enhanced by the desire of corporate and government clients to show their stakeholders reductions in greenhouse gases, has made trucking both more costly and less desirable.

In contrast, rail shipping has much lower fuel costs, uses far fewer drivers and has a far superior safety record.

Railroad cars, commonly referred to as "boxcars", were the original method used for rail freight. Generally, boxcars are unloaded at relatively large terminal facilities including a cross-dock area and warehousing space. Freight is unloaded by forklift, stored temporarily, and then moved again to surface-road transports, such as semi-trucks. In the case of refrigerated or freezer freight, there are few facilities that can provide this specialized storage on rail.

In recent years, very few facilities for hardy produce have been built, and then only for specific shipping corridors; e.g., California and Texas to the U.S. East Coast. These rail terminals comprise elaborate indoor facilities occupying many acres so as to accommodate multiple railroad car trains at once. At present there is only one operator serving coast to coast hardy produce, and rail only accounts for a very small percentage of these kinds of movements. Moreover, such facilities are expensive to build. As there are very few of these terminal facilities, transport trucks have to drive significant distances to load and unload freight, making intermodal transportation of such freight by train less cost-effective.

Over time, the railroad industry has expanded the types of freight carrying vehicles to better accommodate the variety of freight being transported. The use of multi-purpose, intermodal shipping containers is one example. Such intermodal containers, which are essentially rectangular storage containers with one or more loading/unloading openings permitting access to interior storage areas, are configured to be stacked for ship-borne transportation, to be individually loaded atop flatbed trailers, or chassis, and driven via surface roads by transport truck, and to be individually loaded atop railroad well cars for transport by train. In an exemplary shipping scenario, such intermodal containers may be (i) loaded with freight at a manufacturing facility, (ii) the loaded intermodal containers placed on chassis and driven via surface roads to dockside where (iii) the intermodal containers are removed from the chassis and loaded onto a ship for sea-borne transport. When the ship arrives at its destination, the intermodal containers are unloaded and placed, individually, on chassis for movement via surface roads by transport truck. While some such intermodal containers will travel by truck to their ultimate destinations, others of these intermodal containers will travel to intermodal terminals where they are placed, individually, on railroad well cars for shipment by train to a remote intermodal terminal where, once again, the intermodal containers are removed from the railroad cars and placed on chassis for truck transportation via surface roads to their ultimate destinations, where the freight is unloaded.

While intermodal containers enable the freight being shipped to be loaded once at the manufacturing facility or other initial destination and unloaded at the final destination, this advantage comes at a cost. Weight restrictions on surface-road transport (such as semi-trucks, etc.) are lower than the physical limitations of the intermodal containers and, moreover, are lower than the weight restrictions placed on railway transportation. For instance, intermodal containers may have a rail payload limit of approximately 58,000 to 60,000 pounds, but a net weight limit for surface road transportation of roughly 44,000 pounds or less when full (after taking into account the weight of the surface-road transport). To complicate matters further, these weight restrictions on surface-road transports vary from state to state in the U.S., meaning that shipments traversing multiple states must meet the lowest applicable weight restrictions of the states through which the freight is being transported. Given the foregoing, some of the advantages of intermodal containers are lost as those containers are generally transported via rail at or below their capacity for the longest leg of the transportation.

SUMMARY

There is disclosed herein a moveable cross-dock for distributing freight between railroad cars and surface-road transports, as well as a method for its use. The moveable cross-dock comprises a body defining an interior storage area and at least first and second openings in the body through which freight may be moved into and out of the storage area, and a plurality of wheels configured to enable selective movement of the body; a first loading ramp extendible from the body proximate one of the at least first and second openings in the body, the first loading ramp configured to connect to a first intermodal shipping container when the first loading ramp is aligned with a loading/unloading opening of the first intermodal shipping container; and a second loading ramp extendible from the body proximate the other of the at least first and second openings in the body, the second loading ramp configured to connect to a freight container of a first surface-road transport when the second loading ramp is aligned with a loading/unloading opening of the freight container of the first surface-road transport.

According to one feature, the moveable cross-dock is configured to connect to the body to a prime mover to selectively move the body.

Per another feature, the interior storage area of the cross-dock body is a temperature-controlled storage area.

According to a further feature, a loading tunnel surrounds each of the at least first and second loading ramps.

Per still another feature, the body defines at least first, second and third openings through which freight may be moved into and out of the storage area, and first, second and third loading ramps extendible from the body proximate one of each of the at least first, second and third openings in the body. The first loading ramp is configured to connect to a first intermodal shipping container, and the second and third loading ramps are configured to connect to freight containers of first and second surface-road transports.

The foregoing moveable cross-dock may, in one form of the present invention, be part of an intermodal shipping terminal of the type where intermodal shipping containers are moved between different transportation vehicles.

The method of distributing freight between an intermodal shipping container and the freight containers of one or more surface-road transports comprising the steps of:

providing a freight container of at least a first surface-road transport;

providing a first intermodal shipping container containing freight having a collective weight in excess of the maximum weight that can be lawfully carried in the freight container of the at least first surface-road transport;

providing a selectively moveable cross-dock having a body defining an interior storage area and at least first and second openings in the body through which freight may be moved into and out of the interior storage area;

positioning a loading/unloading opening of the first intermodal shipping container proximate one of the at least first and second openings in the moveable cross-dock;

positioning a loading/unloading opening of the freight container of the at least first surface-road transport proximate the other of the at least first and second openings in the moveable cross-dock; and distributing freight between the first intermodal shipping container and the freight container of the at least first surface-road transport via the at least first and second openings of the moveable cross-dock. The distribution step does not continue beyond the point at which the collective weight of all freight in the freight container of each at least first surface-road transport would cause each at least first surface road transport to exceed the maximum lawful surface-road transportation weight.

According to one feature, the first intermodal shipping container is disposed on a railroad well car, and the step of positioning the loading/unloading opening of the first intermodal shipping container proximate one of the at least first and second openings in the moveable cross-dock comprises moving the moveable cross-dock relative to the first intermodal shipping container.

Per another feature, the step of positioning the loading/unloading opening of the first intermodal shipping container proximate one of the at least first and second openings in the moveable cross-dock comprises moving the first intermodal shipping container relative to the moveable cross-dock.

Per a still further feature, where the freight comprises perishable freight, the interior storage area of the moveable cross-dock body is a temperature-controlled storage area.

According to another feature, the moveable cross-dock further comprises a loading tunnel surrounding each of the at least first and second openings, an end of each loading tunnel configured to be positioned adjacent a loading/unloading opening in each of the first intermodal shipping container and the freight container of the at least first surface-road transport. Further, the step of positioning the loading/unloading opening of the first intermodal shipping container proximate one of the at least first and second openings in the moveable cross-dock comprises positioning the loading/unloading opening in the first intermodal shipping container in close proximity to an end of one of the loading tunnels; and the step of positioning the loading/unloading openings of the freight container of the first surface-road transport proximate another of the at least first and second openings in the moveable cross-dock comprises positioning the loading/unloading opening in the freight container of the at least first surface-road transport in close proximity to an end of another of the loading tunnels.

Per another feature, the method further comprises the step, following the step of distributing freight between the first intermodal shipping container and the freight container of the at least first surface-road transport, of placing the first intermodal shipping container on a chassis of a surface-road transport. The distribution step continues to at least the point at which the collective weight of all freight in the first intermodal shipping container is no more than the maximum weight that can be lawfully carried via surface-road transportation of the first intermodal shipping container.

According to yet another feature, the method further comprises the steps of:

providing a freight container of a second surface-road transport;

replacing the freight container of the first surface-road transport with the freight container of the second surface-road transport after a desired amount of freight has been distributed between the intermodal shipping container and the freight container of the first surface-road transport, so that a loading/unloading opening of the freight container of the second surface-road transport is positioned proximate the other of the at least first and second openings in the moveable cross-dock; and distributing freight between the first intermodal shipping container and the freight container of the second surface-road transport via the at least first and second openings of the moveable cross-dock. The distribution step does not continue beyond the point at which the collective weight of all freight in the freight container of the second surface-road transport would cause the second surface-road transport to exceed the maximum lawful surface-road transportation weight. In one form, the method further comprises the step, following the step of distributing freight between the first intermodal shipping container and the freight container of the second surface-road transport, of placing the first intermodal shipping container on a chassis of a surface-road transport. The distribution step continues to at least the point at which the collective weight of all freight in the first intermodal shipping container is no more than the maximum weight that can be lawfully carried via surface-road transportation of the first intermodal shipping container.

According to one feature, the moveable cross-dock has at least first, second and third openings in the body through which freight may be moved into and out of the interior storage area, and the method further comprises the steps of:

providing a freight container of a second surface-road transport;

positioning the loading/unloading opening of the first intermodal shipping container proximate one of the at least first, second and third openings in the moveable cross-dock;

positioning the loading/unloading opening of the freight container of the first surface-road transport proximate another of the at least first, second and third openings in the moveable cross-dock;

positioning a loading/unloading opening of the freight container of the second surface-road transport proximate another of the at least first, second and third openings in the moveable cross-dock; and distributing freight between the first intermodal shipping container and the freight containers of the first and second surface-road transports via the at least first, second and third openings of the moveable cross-dock. The distribution step does not continue beyond the point at which the collective weight of all freight in the freight containers of each of the first and second surface-road transports would cause each of the first and second surface-road transport to exceed the maximum lawful surface-road transportation weight. In one form, the method further comprises the step, following the step of distributing freight between the first intermodal shipping container and the freight containers of the first and second surface-road transports, of placing the first intermodal shipping container on a chassis of a surface-road transport. The distribution step continues to at least the point at which the collective weight of all freight in the first intermodal shipping container does not exceed the maximum weight that can be lawfully carried via surface-road transportation of the first intermodal shipping container.

BRIEF DESCRIPTION OF THE DRAWINGS

The present application will be better understood with reference to the following detailed description and accompanying drawings, of which:

FIGS. 4A-4D are schematic, cut-away representations of a container, a surface-road transport, and the cross-dock of the present invention, each depicting a step in an exemplary process of distributing freight from the container to the surface-road transport via the cross-dock (though, as noted in the written description, the process may also be conducted in reverse—i.e., from the surface-road transport to the container);

DETAILED DESCRIPTION

Figure 1A:
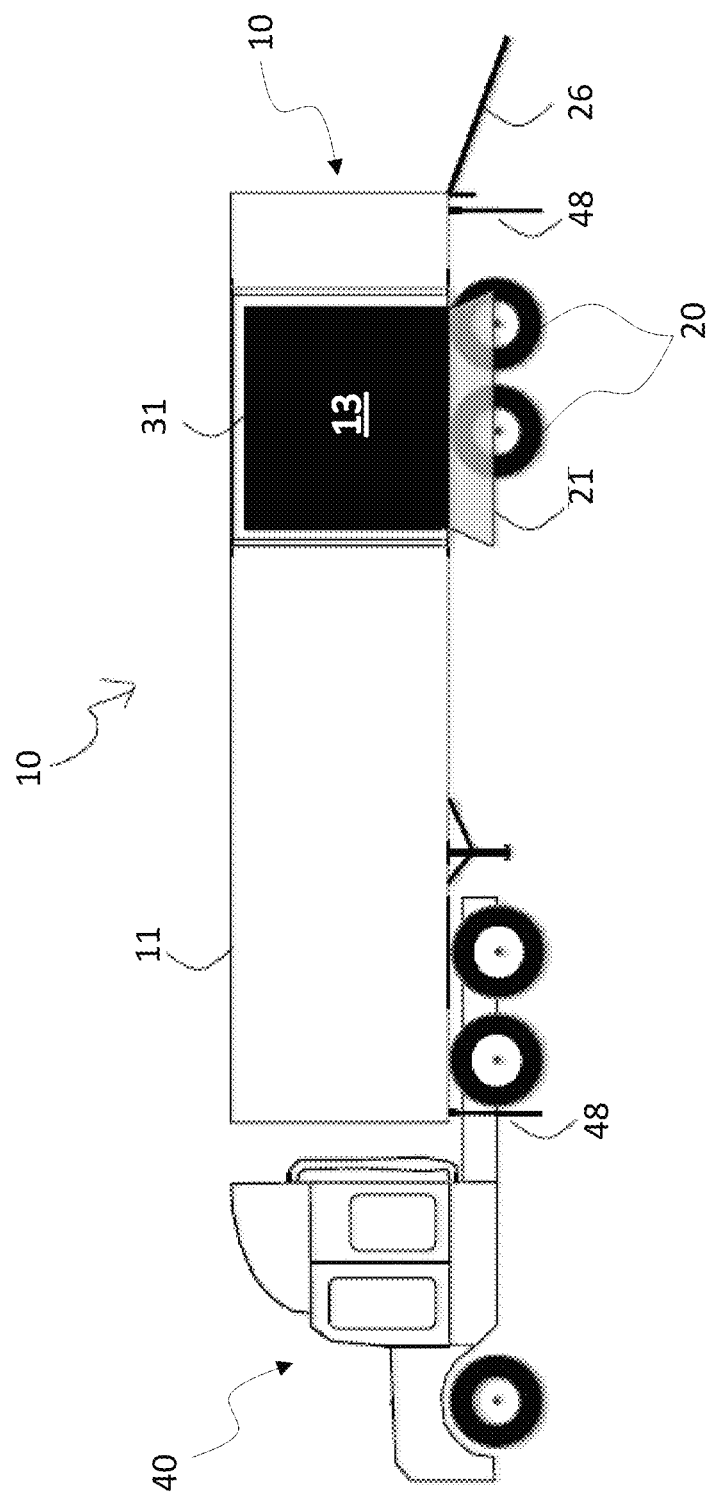
FIG. 1A is a lateral elevational view of a movable cross-dock according to a first embodiment of the invention.

As used herein, the word "freight" is intended to refer to any freight which may be transported via ship, rail and surface road, including perishable and non-perishable freight of any and all kinds. It will be appreciated that such freight as comprehended by this specification may be packaged in any conventional fashion, and may or may not be palletized.

As used herein, the term "surface-road transport" is, unless otherwise specified, intended to comprehend any vehicle adapted to ship freight via surface road, including, without limitation, trucks (i.e., with fixed freight storage containers), semitrailers (i.e., with selectively removable freight storage containers), container or flatbed trucks (i.e., semis with a chassis adapted to carry a freight container, such as, for instance, an intermodal shipping container), etc. The term "freight container," in turn, means and refers to any container that can be/is transported via surface-road transport, whether fixed to the surface road vehicle or removable (whether comprising a trailer or a chassis supporting an intermodal container, etc.). Unless otherwise specified, the term "surface-road transport" comprehends in its meaning a "freight container" portion that is conveyed by the surface-road transport.

As used herein, the term "prime mover" means and refers to any motorized vehicle capable of towing or otherwise moving the moveable cross-dock according to one embodiment disclosed herein. Without limitation, a prime mover may comprise a semi-truck, a truck, a tractor, etc.

As used herein, the phrase "maximum lawful surface-road transportation weight," or similar variants thereof, means the maximum permissible weight, as defined by any law, regulation or other prohibition, of a surface-road vehicle (inclusive of the freight carried thereby—i.e., the gross weight) travelling on the surface roads of any one or more jurisdictions (e.g., country, state, etc.) through which freight carried by the surface-road vehicle is transported. Similarly, the phrase "no more than the maximum weight that can be lawfully carried via surface-road transportation of the intermodal shipping container," or similar variants thereof, means the maximum permissible weight, as defined by any law, regulation or other prohibition, of a surface-road vehicle (inclusive of the intermodal shipping container and freight contained therein) travelling on the surface roads of any one or more jurisdictions (e.g., country, state, etc.) through which the intermodal shipping container carried by the surface-road vehicle is transported. Similarly, the phrase "maximum weight that can be lawfully carried in the freight container of the at least first surface-road transport," or similar variants thereof, means the maximum permissible weight, as defined by any law, regulation or other prohibition, of a surface-road vehicle (inclusive of the freight container and freight contained therein—i.e., the gross weight) travelling on the surface roads of any one or more jurisdictions (e.g., country, state, etc.) through which the freight container carried by the surface-road vehicle is transported.

As used herein, the terms "containers" and "freight containers" mean, unless otherwise specified, any freight container including, without limitation, both intermodal shipping containers, the freight containers of surface-road transports, and rail-borne freight containers. As used herein, the term "rail-borne freight containers" means and refers to any freight container moved by rail, including, without limitation, both intermodal shipping containers as well as boxcars and the like.

With reference being had also to the drawings, the present disclosure may be better understood.

Turning first to FIGS. 1A-1D and 4A-4D, there is shown in an exemplary embodiment a moveable cross-dock 10 for bridging the distribution of freight between freight containers and surface-road transports. The moveable cross-dock 10 comprises a body 11 defining an interior storage area 12 (see FIGS. 4A-4D) and at least first 13 and second 14 openings in the body through which freight may be moved into and out of the storage area, and a plurality of wheels 20 configured to enable selective movement of the body 11.

According to the embodiment of FIGS. 1A-1D, the body 11 will be seen to include two openings 14, 15 on one side thereof and a single opening 13 on the opposite side. It will be understood from this disclosure, however, that the body 11 may have one or more openings on each side thereof. For instance, there is shown in FIGS. 2A-2C a variant form of the cross-dock 10' having two openings 13', 14', 15', 16' per side, as well as an access ramp 26' of the type described further below.

Figure 1B:
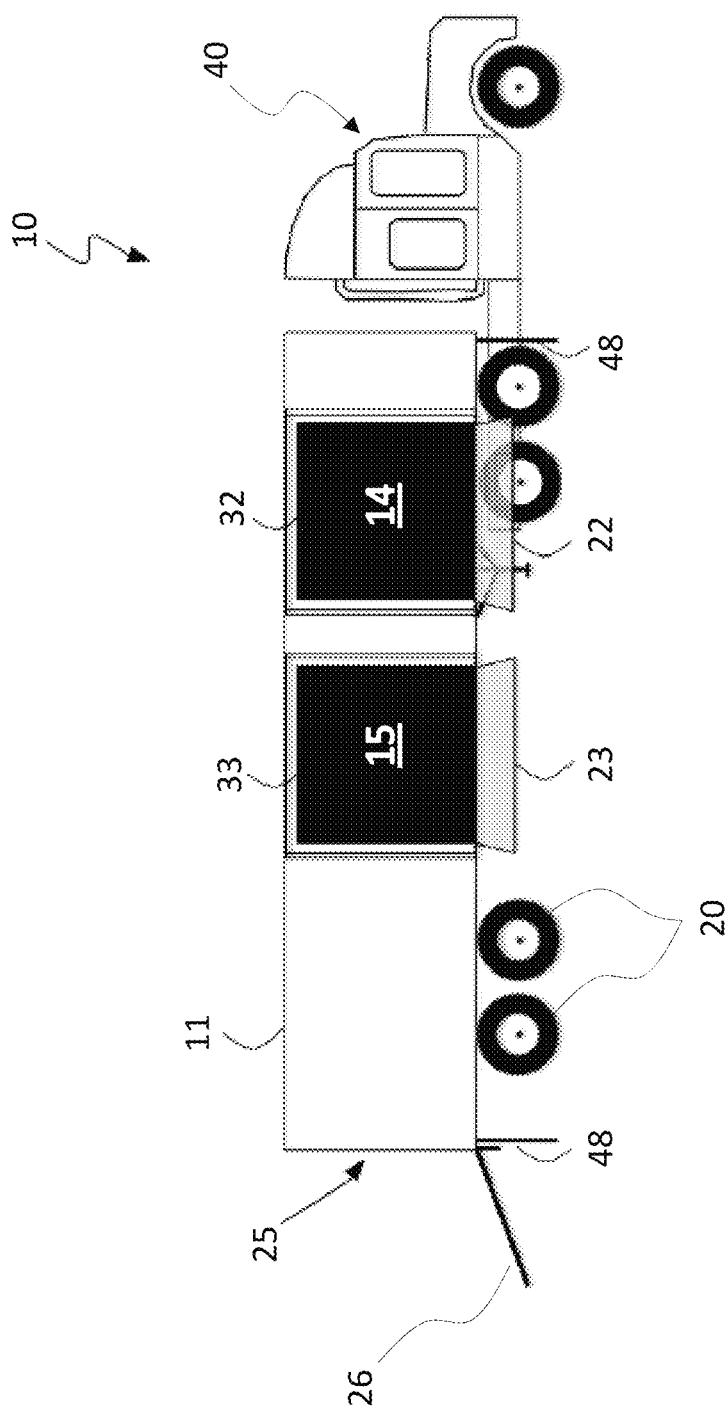
FIG. 1B is an opposite lateral elevational view of a movable cross-dock according to the embodiment of FIG. 1A.
Figure 1C:
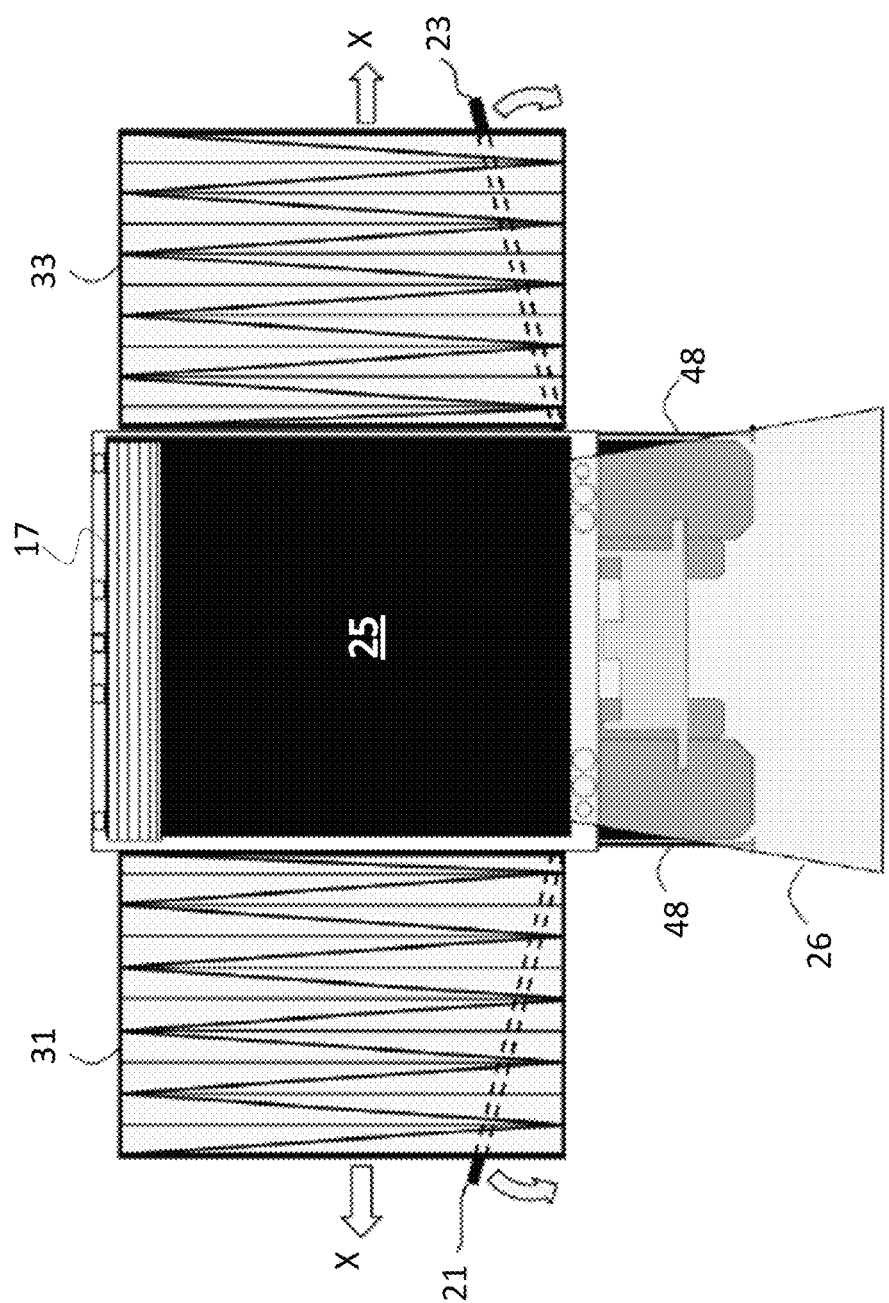
FIG. 1C is a rear elevational view of the movable cross-dock of FIG. 1A.
Figure 1D:
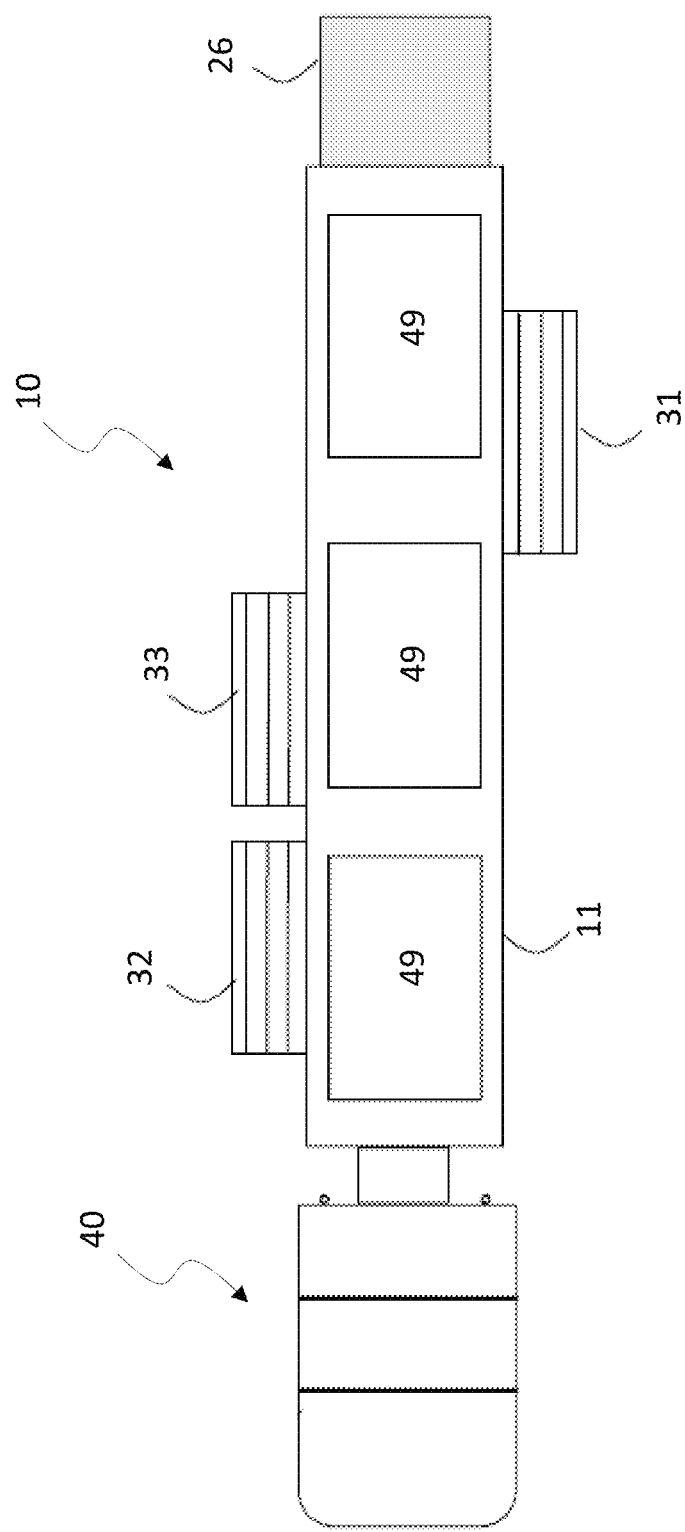
FIG. 1D is a top-down view of the movable cross-dock of FIG. 1A.
Figure 2A:
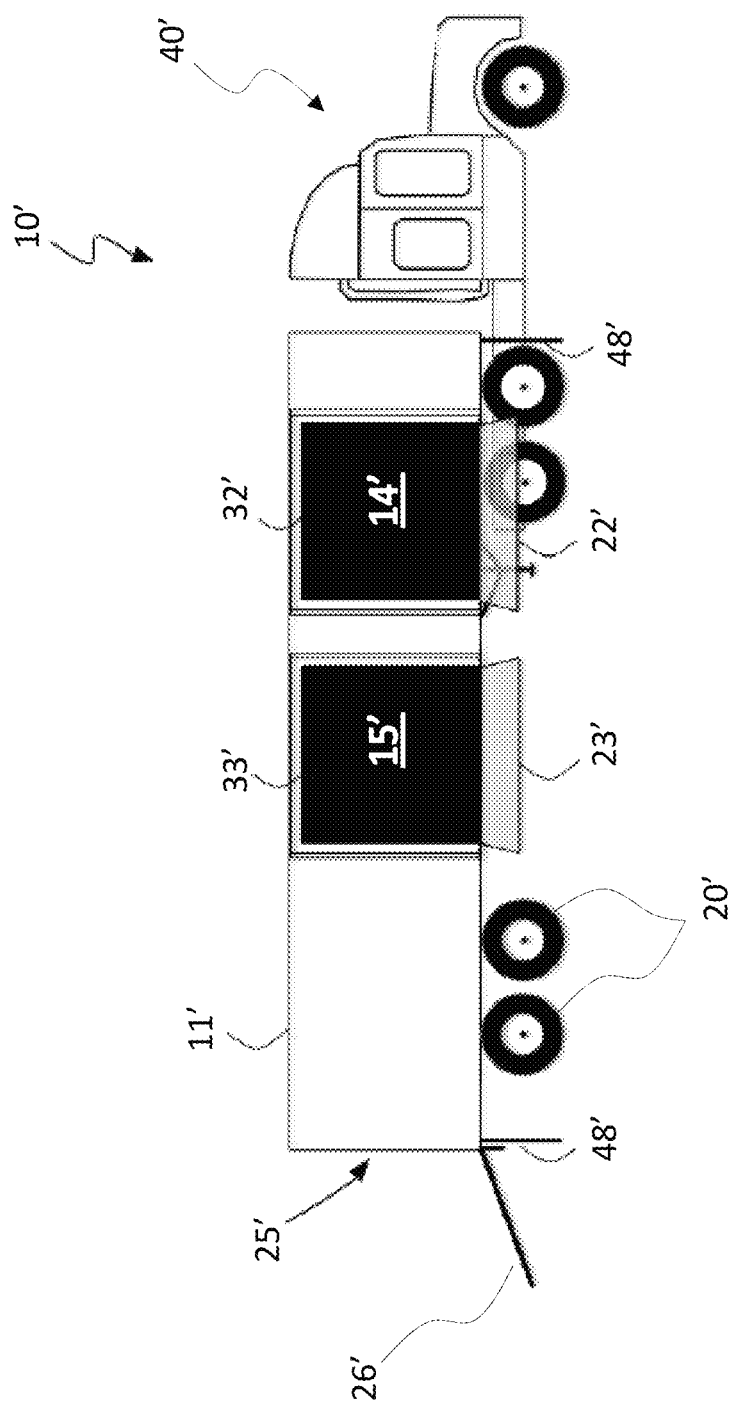
FIG. 2A is a lateral elevational view of a movable cross-dock according to a second embodiment of the invention.
Figure 2B:
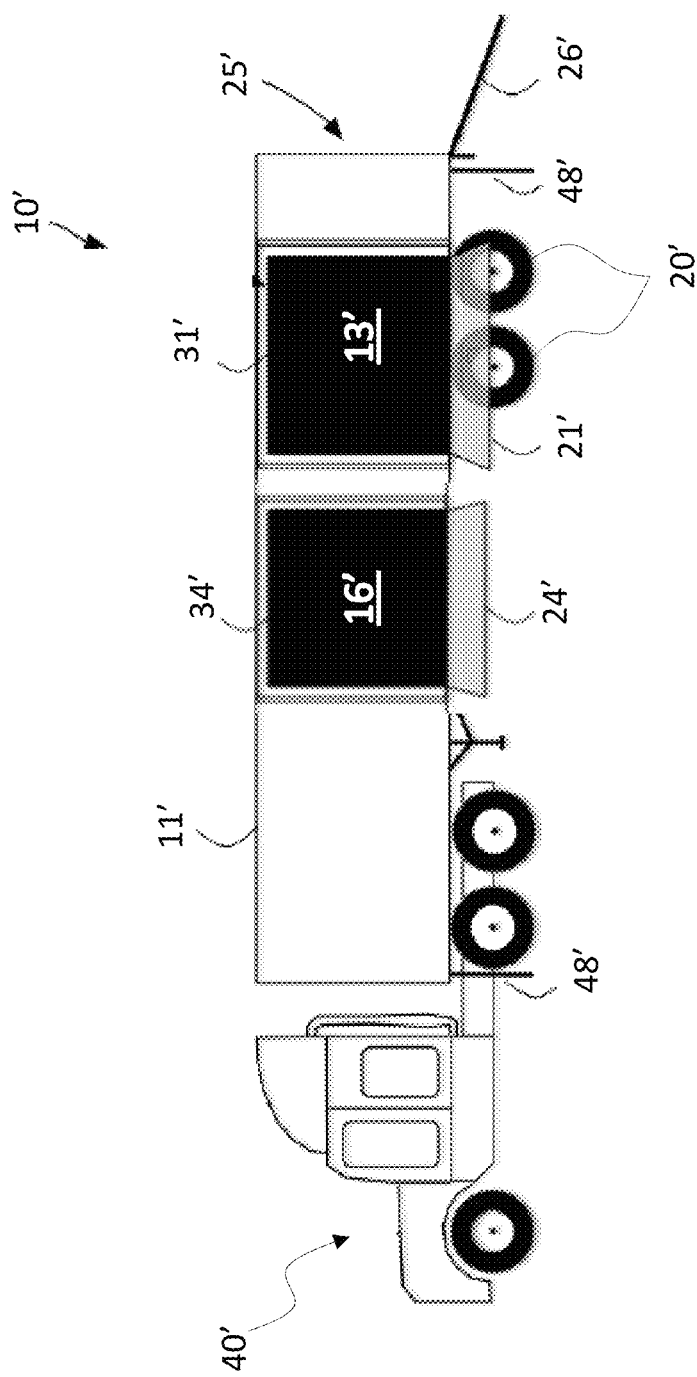
FIG. 2B is an opposite lateral elevational view of the movable cross-dock of FIG. 2A.
Figure 2C:
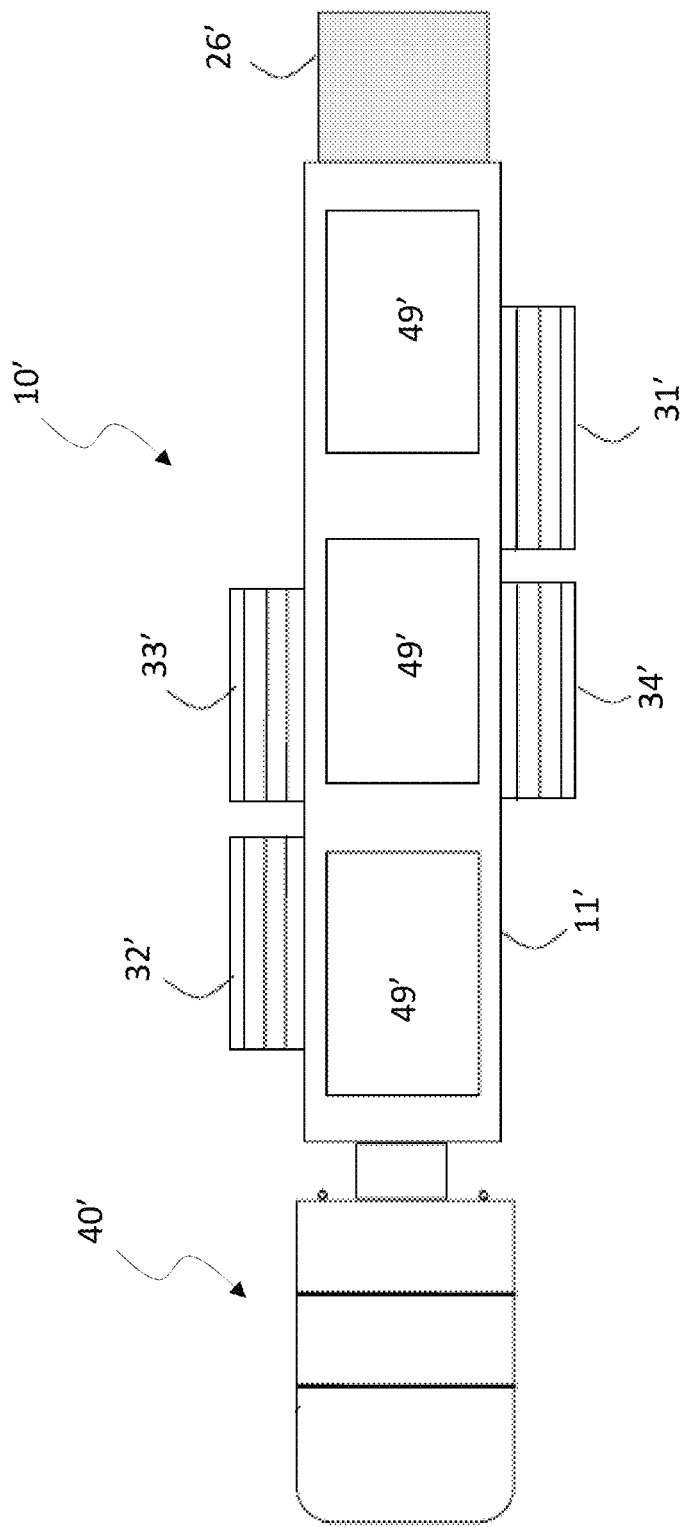
FIG. 2C is a top-down view of the movable cross-dock of FIG. 2A.
Figure 3:
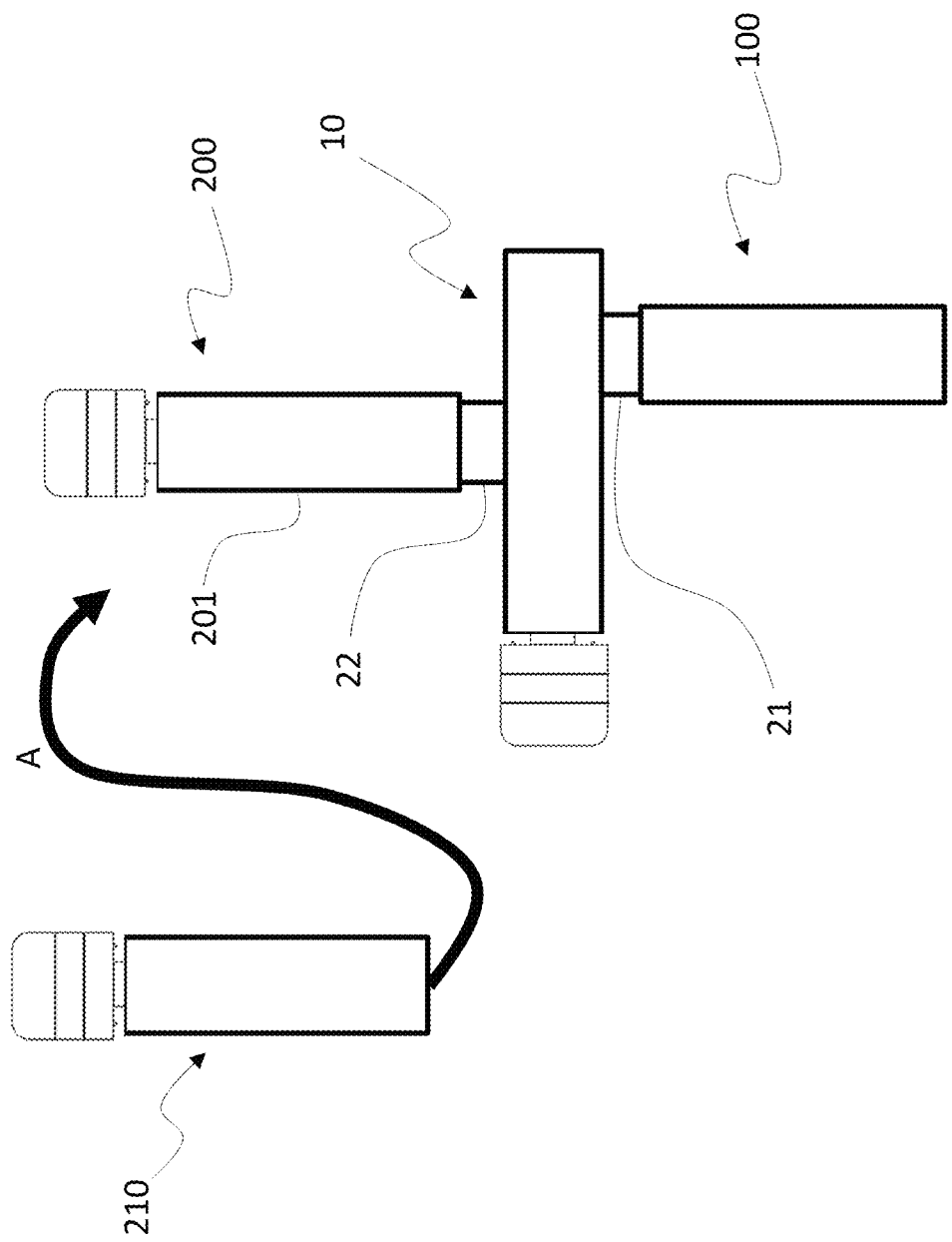
FIG. 3 shows the general method of distributing freight between a container and a surface-road transport via the cross-dock of the present invention.
Figure 4B:
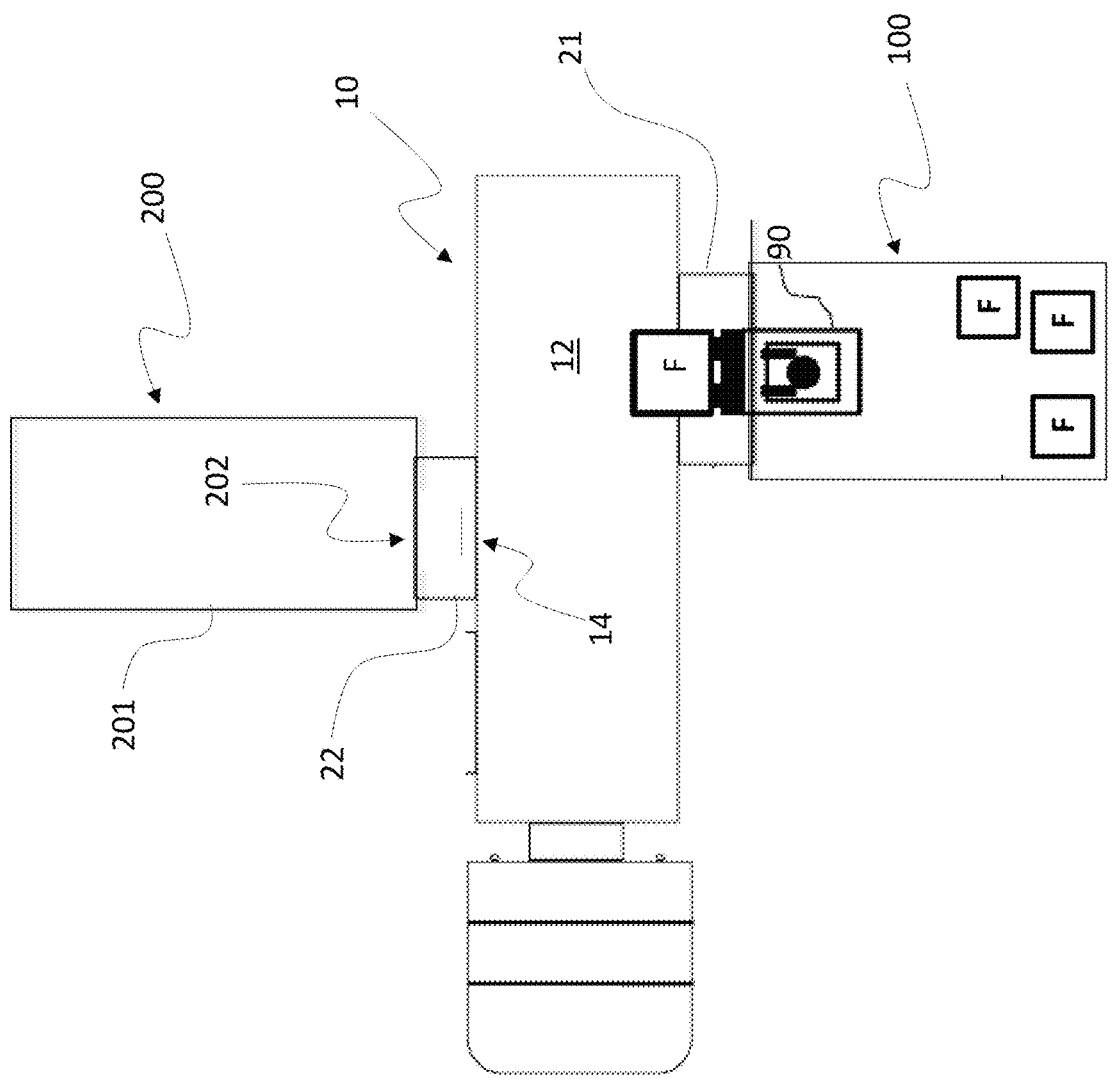
Figure 4C:
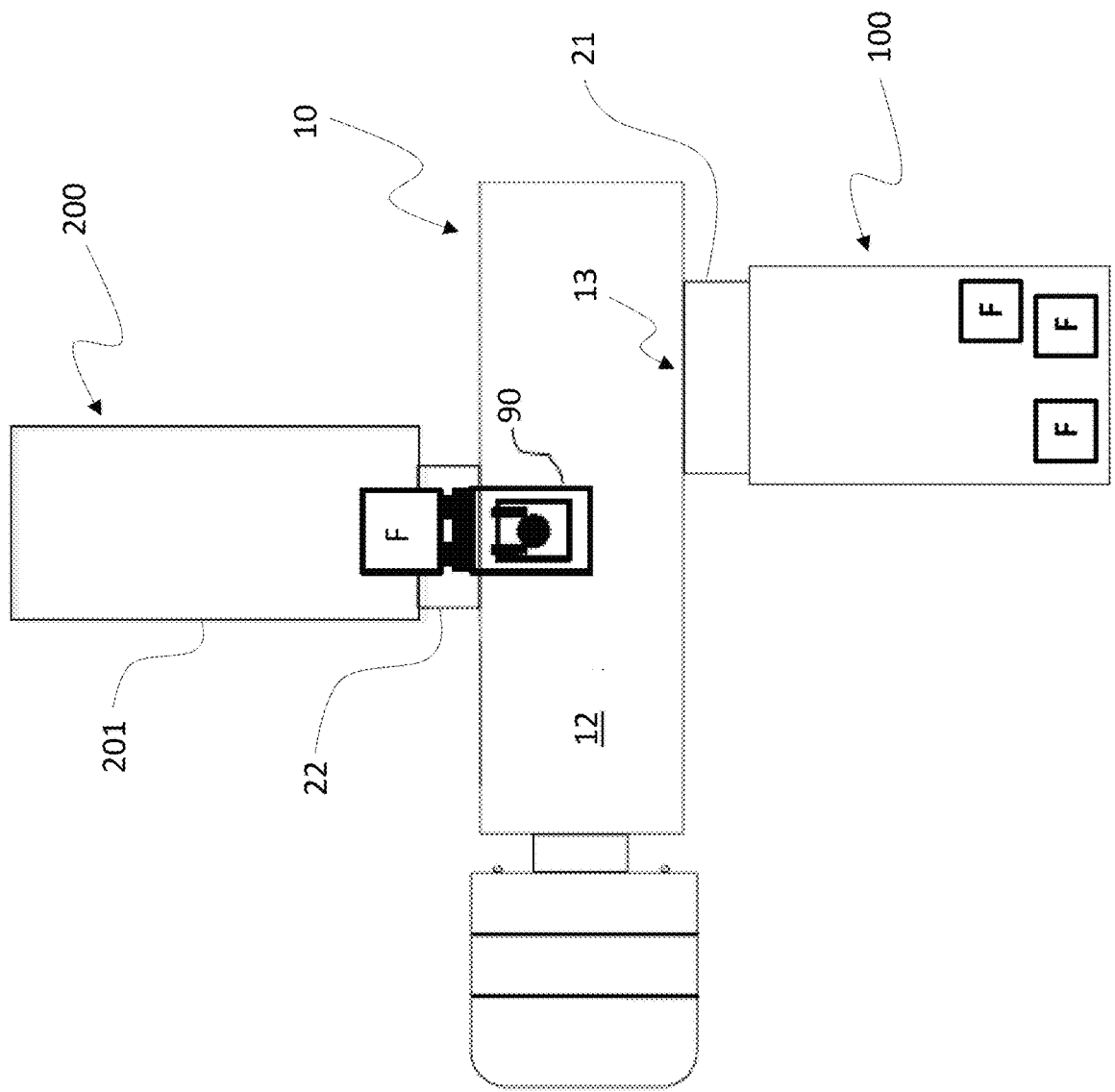
Figure 5:
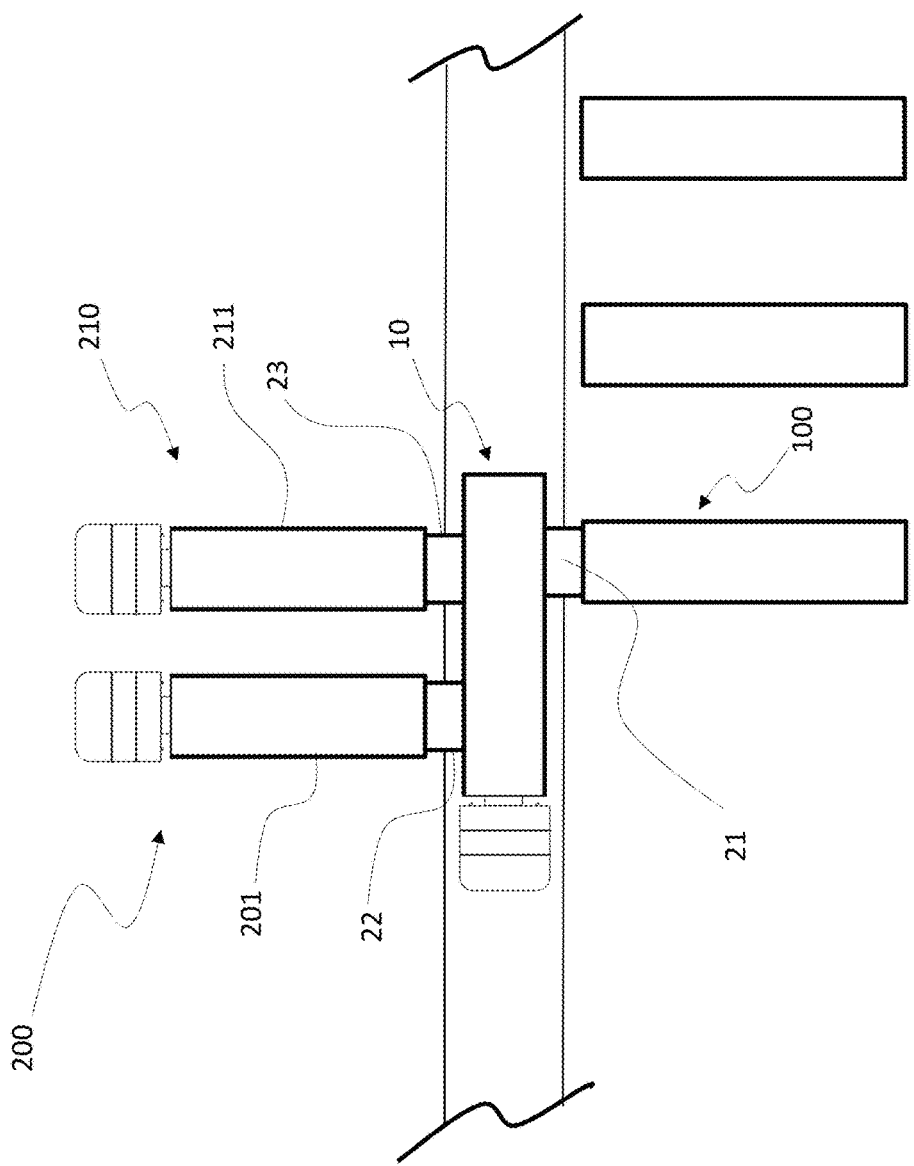
FIG. 5 shows an alternative method of simultaneously distributing freight between a container and two surface-road transports via the cross-dock of the present invention.

As shown best in FIGS. 1A-1C, a first loading ramp 21 is extendable from the body proximate one of the at least first 13 and second 14 openings in the body 11. As described further below, the first loading ramp 21 is configured to connect to a first freight container (not shown in FIGS. 1A-1C) when the first loading ramp is aligned with an opening of the first freight container.

A second loading ramp 22 is extendable from the body 11 proximate the other of the at least first 13 and second 14 openings, the second loading ramp 22 configured to connect to the freight container of a first surface-road transport (not shown in FIGS. 1A-1D) when the second loading ramp is aligned with an opening of the freight container of the first surface-road transport.

Additionally, there is shown a rear opening 25 with an optional access ramp 26 extendible therefrom. Access ramp 26 may extend to the ground or other support surface to enable a freight-moving vehicle, such as a forklift, by way of non-limiting example, to be driven into the storage area 12.

As best shown in FIG. 1C, each opening (in FIG. 1C, only rear opening 25 is depicted) preferably, though not necessarily, includes a closure (labelled 17 for rear opening 25). Such closures are particularly desirable when the cross-dock body comprises a temperature-controlled storage area, as it will be desirable to seal the storage area to maintain the requisite interior temperature. Each such closure may be of conventional design and construction and may comprise, for instance, one or more hinged doors, one or more doors which slide across the exterior surface of the body adjacent the associated opening (e.g., like a railroad boxcar door) or, as illustrated, a roll-up/roll-down door. Preferably, though not necessarily, it is desirable that the closures take up a minimum of space when opened.

Also according to the illustrated embodiment, each opening 13, 14, 15, etc. and its associated loading ramp 21, 22, 23, etc. is surrounded by a selectively extendible (away from the body 11 in the direction of the arrows X in FIG. 1C) loading tunnel 31, 32, 33 (32 is not visible in FIG. 1C), respectively, each such tunnel forming a substantially sealed passageway between the body 11 and the adjacent freight containers. The extendible loading tunnels 31, 32, 33 protect from weather conditions and provide a substantially sealed environment between the body 11 and the adjacent freight containers.

To facilitate the distribution of freight that is perishable, the interior storage area 12 may optionally be climate-controlled, by any conventional means suitable to the purpose, for maintaining freight at a desired temperature during distribution. This allows the cross-dock to optionally be used for handling freight such as produce, meat, frozen food items and/or other perishable freight. The cross-dock 10 can also serve as a climate-controlled terminal for the temporary storage of perishable freight. The cross-dock 10 according to this optional configuration is thus suited to applications where perishable freight (such as, by way of non-limiting example, palletized and/or floor loaded food products/time sensitive commodities and freight shipped in refrigerated or freezer freight containers and transferred to refrigerated/freezer trailers equipped with self-contained refrigeration equipment) requires one or two days of on-site storage prior to delivery off-site, and does not need conventional warehousing storage prior to delivery by surface-road transport.

Still referring to FIGS. 1A-1D, the cross-dock 10 is shown as comprising a wheeled trailer that is configured to be selectively coupled to a prime mover, such as the illustrated semi-truck 40, to facilitate the selective movement of the cross-dock 10. The means for connecting the cross-dock body 11 to the prime mover may be any of the various types known in the art. Alternatively, the cross-dock may comprise means for its own locomotion. For instance, the cross-dock may comprise a truck integral with the body 11.

Adjustable support legs 48 extendible downwardly from the corners of the body 11 permit the body to be maintained at a desired height; e.g., a height that is substantially equal to the height of the floor of the freight containers to which the cross-dock is connected. In practice, adjustable support legs 48 are extended when the cross-dock is no longer supported by the semi-truck 40 at its front end.

As shown in the embodiments of each of FIGS. 1A-1D and 2A-2C, one or more transparent or translucent panels 49, 49' may optionally be provided in the roof of the body 11, 11' to assist with visibility in the interior storage area 12, 12'.

Accessory equipment may also be added to the mobile cross dock 10. For example, the accessory equipment may include live floors, robotic arms, etc. (not illustrated). In these cases, it may be possible to move freight between freight containers without the use of a forklift or with at least reduced reliance on a forklift.

As manifest from this specification, the moveable cross-dock 10 of the present invention has utility at terminals of the type where freight is distributed between freight containers and surface-road transports, including intermodal terminals, shipyards, and/or rail-yard terminals. The method of utilizing the moveable cross-dock in such environments will now be discussed with reference to FIGS. 3 and 4A-4D, in connection with which drawings (and the related written description) the method of the present invention is exemplified in connection with the distribution of freight between intermodal shipping containers (whether transported by rail or ship) and surface-road transports. It will be appreciated from the following discussion how the inventive method may easily be employed to facilitate the distribution of freight between surface-road transports and freight containers other than intermodal shipping containers.

More specifically, the exemplary method of distributing freight between intermodal shipping containers and surface-road transports fundamentally comprises the steps of: Providing a selectively moveable cross-dock 10 such as heretofore described; positioning a first intermodal shipping container 100 containing freight proximate one of the at least first 13 and second 14 openings in the moveable cross-dock; positioning a first surface-road transport 200 proximate the other of the at least first 13 and second 14 openings in the moveable cross-dock, the first surface-road transport including a freight container 201; and distributing freight between the first intermodal shipping container 100 and the freight container 201 of the first surface-road transport via the at least first 13 and second 14 openings of the moveable cross-dock and loading/unloading openings 101, 202 of the intermodal shipping container and freight container, respectively.

Further according to the illustrated embodiment of FIGS. 3 and 4A-4D, the intermodal shipping container contains freight having a collective weight in excess of the maximum weight that can be lawfully carried in the freight container of the at least first surface-road transport. As will be appreciated from the remainder of this disclosure, this disposition of freight in the intermodal shipping container is facilitated by the present invention's ability to permit such freight to be distributed to one or more surface-road vehicles in a manner which permits each such surface-road vehicle to transport the freight via surface-roads without violating the weight restrictions that may be applicable in any one or more jurisdictions through which the surface-road vehicles transport the freight.

Still more particularly, and with continuing reference to the exemplary method of FIGS. 3 and 4A-4D, the moveable cross-dock 10 is positioned perpendicular to the intermodal shipping container 100 and the access ramp 22 of the cross-dock 10 is aligned with a freight unloading/loading opening 101 of the intermodal freight container. The access ramp 22 is connected to the rail-borne freight container so that it can bear load. As may be required, the retractable loading tunnel 32 is extended towards the opening 101 of the intermodal shipping container and creates a seal around it.

Next, the freight container 201 of a surface-road transport 200 is aligned with the opening 13 and backed into position. The loading ramp 21 is then connected to the loading/unloading opening 202 of the freight container 201. As may be required, the retractable loading tunnel 31 is extended towards the opening 202 of the freight container and creates a seal around it.

Freight may then be distributed from the intermodal shipping container 100, through the interior storage area 12 of the mobile cross-dock 10, and into the freight container 201 of the surface-road transport 200 via the loading ramps 21, 22. This process is exemplified in FIGS. 4A-4D, wherein the process of moving freight F by forklift 90 from the interior of the intermodal shipping container 100 to the interior of the freight container 201 via the interior storage area 12 of the cross-dock 10 is depicted.

To ensure that the surface-road vehicle 200 can lawfully move along the roads of all jurisdictions (e.g., states, countries, etc.) through which it may travel in the transportation of the freight, distribution of the freight between the first intermodal shipping container 100 and the freight container 201 of the at least first surface-road transport via the cross-dock 10 does not continue beyond the point at which the collective weight of all freight in the freight container 201 would cause the surface road transport 200 to exceed the maximum lawful surface-road transportation weight.

The process of loading an intermodal shipping container with freight from the freight container of a surface-road transport is essentially the same as described above, except that the distribution of freight is reversed; i.e., freight is distributed from the freight container of the surface-road transport to the intermodal shipping container. By way of example and without limitation, it will be appreciated by those skilled in the art that the reverse steps of the above-described method may be implemented where it is desired to combine the freight of one, two or even more surface-road transports into a single intermodal shipping container for subsequent conveyance by rail or ship. While each surface-road transport might be prohibited by applicable weight restrictions from individually carrying so much freight, less restrictive weight restrictions applicable to freight transport by rail or ship would favor the economy of consolidating the freight from multiple surface-road transports into a single intermodal shipping container for rail or ship transportation.

Once a desired amount of freight has been distributed between the intermodal shipping container 100 and the surface-road transport 200, the freight container 211 of a second surface-road transport 210 may be aligned with the loading ramp 21 and backed into position (represented schematically by the arrow A of FIG. 3) so that additional freight from the intermodal shipping container 100 may be distributed to the freight container 211 of the surface-road transport 210. That process may be repeated with third and subsequent surface-road transports as necessary or desired.

Alternatively, and as shown in the embodiment of FIGS. 1A-1D and 5, the cross-dock 10 of the present invention may comprise a sufficient number of openings 12, 13, 14 and loading ramps 21, 22, 23 to facilitate the simultaneous distribution of freight between an intermodal freight container 100 and the freight containers 201, 211 of two or more surface-road vehicles 200, 210. As will be appreciated, the distribution of freight between the intermodal freight container and the two or more freight containers 201, 211 of two or more surface-road vehicles occurs essentially as described heretofore; and, once the desired amount of freight has been distributed between the intermodal freight container and the freight containers 201, 211, additional surface-road transports may, as necessary, be positioned proximate the cross-dock 10 (also essentially as described heretofore) in place of those into which freight has already been distributed.

As will be appreciated, the various freight within the intermodal freight container may be distributed to the freight containers of different surface-road transports, since such freight may be going to different end destinations, need different treatments (for instance, some freight may require refrigeration while other freight may not), and/or have otherwise different logistical issues which necessitate different treatment. The mobile cross-dock of the present invention allows for an efficient transfer of freight between intermodal freight container and the freight containers of surface-road transports and, since there can be a plurality of transport trailers aligned with the various openings of the mobile cross dock at the same time, sorting of freight can take place in real time while the freight is being distributed. In one implementation, the distribution of freight may be facilitated by providing an indication, via, for instance, an inventory list, tagging system, etc., of which freight container of which surface-road transport freight should be loaded into. Rather than sorting freight and then distributing it to particular freight containers one at a time, the mobile cross-dock according to the present invention thus allows for the sorting and distribution of the freight into one of a plurality of potential freight containers to occur simultaneously.

Figure 6:
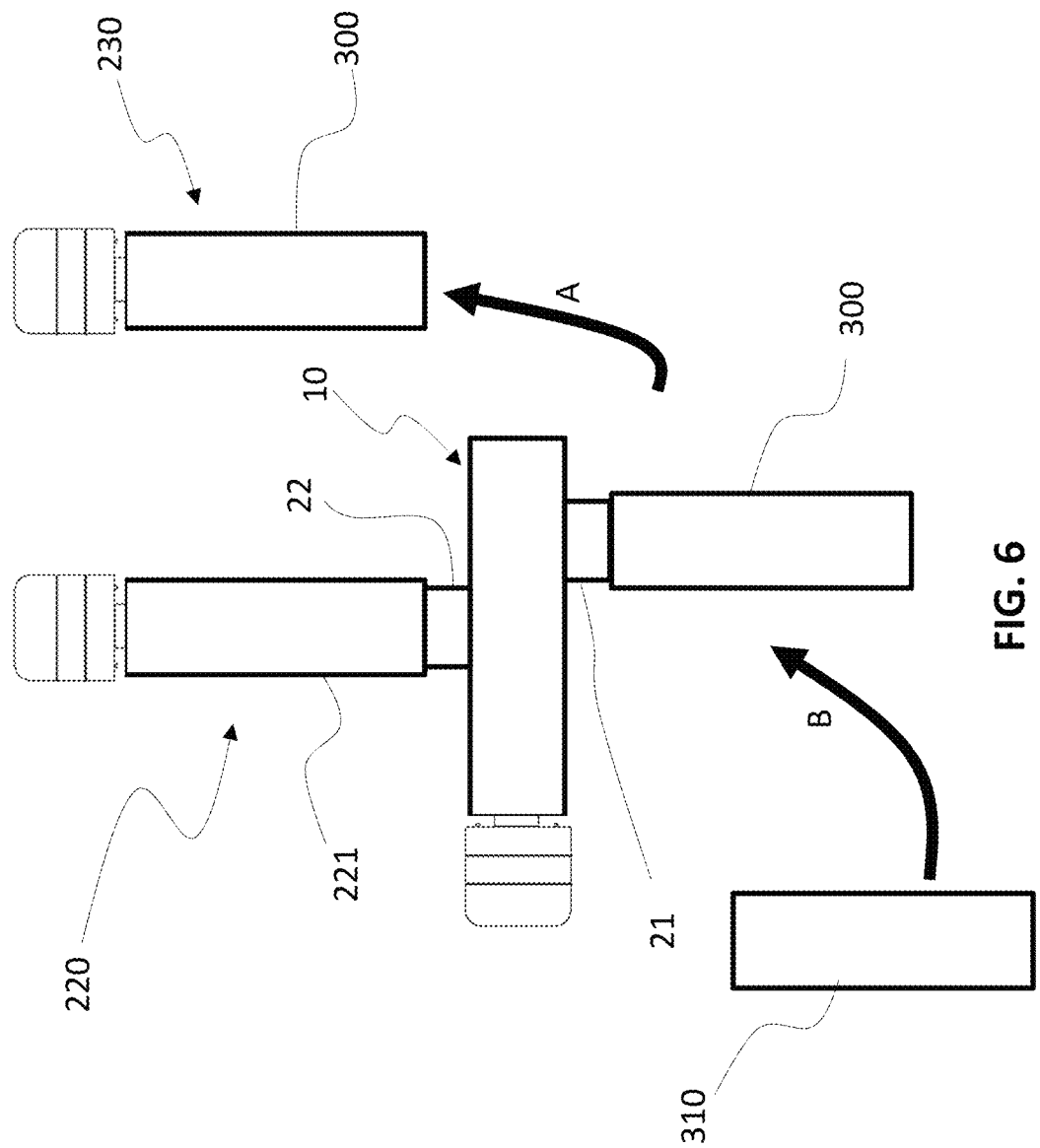
FIG. 6 shows an alternative method of distributing freight between an container and a surface-road transport via the cross-dock of the present invention.

Referring now to FIG. 6, it will be understood that, where the freight container comprises an intermodal shipping container 300, the method of the present invention comprehends that the shipping container 300 may itself be transferred (indicated by the arrow A) to the chassis of a surface-road transport 230 after a desired amount of freight has been distributed between intermodal shipping container 300 and the freight container 221 of at least a first surface-road vehicle 220. Indeed, it will be understood that this utilization of the present invention permits the intermodal shipping container to be filled to capacity for travel by rail, and the freight then distributed amongst one or more freight containers of surface-road vehicles before the intermodal freight container is itself reduced in weight to a point where it can be transported by a surface-road vehicle in compliance with applicable load restrictions for surface-road transportation. In other words, the distribution of freight from the intermodal shipping container to the one or more surface-road vehicles continues to at least the point at which the collective weight of all freight in the intermodal shipping container is no more than the maximum weight that can be lawfully carried via surface-road transportation of the intermodal shipping container.

With continuing reference to FIG. 6, it will also be appreciated that, after a desired amount of freight has been distributed between shipping container 300 and the freight container 221 of at least a first surface-road vehicle 220, and the intermodal shipping container 300 is transferred to the chassis of a surface-road transport 230, another intermodal shipping container 310 may be positioned (indicated by the arrow B) proximate the cross-dock 10 so that additional freight may be distributed to one or more additional surface-road transports (not depicted) and/or to the freight container 221 of at least a first surface-road vehicle 210.

Figure 7A:
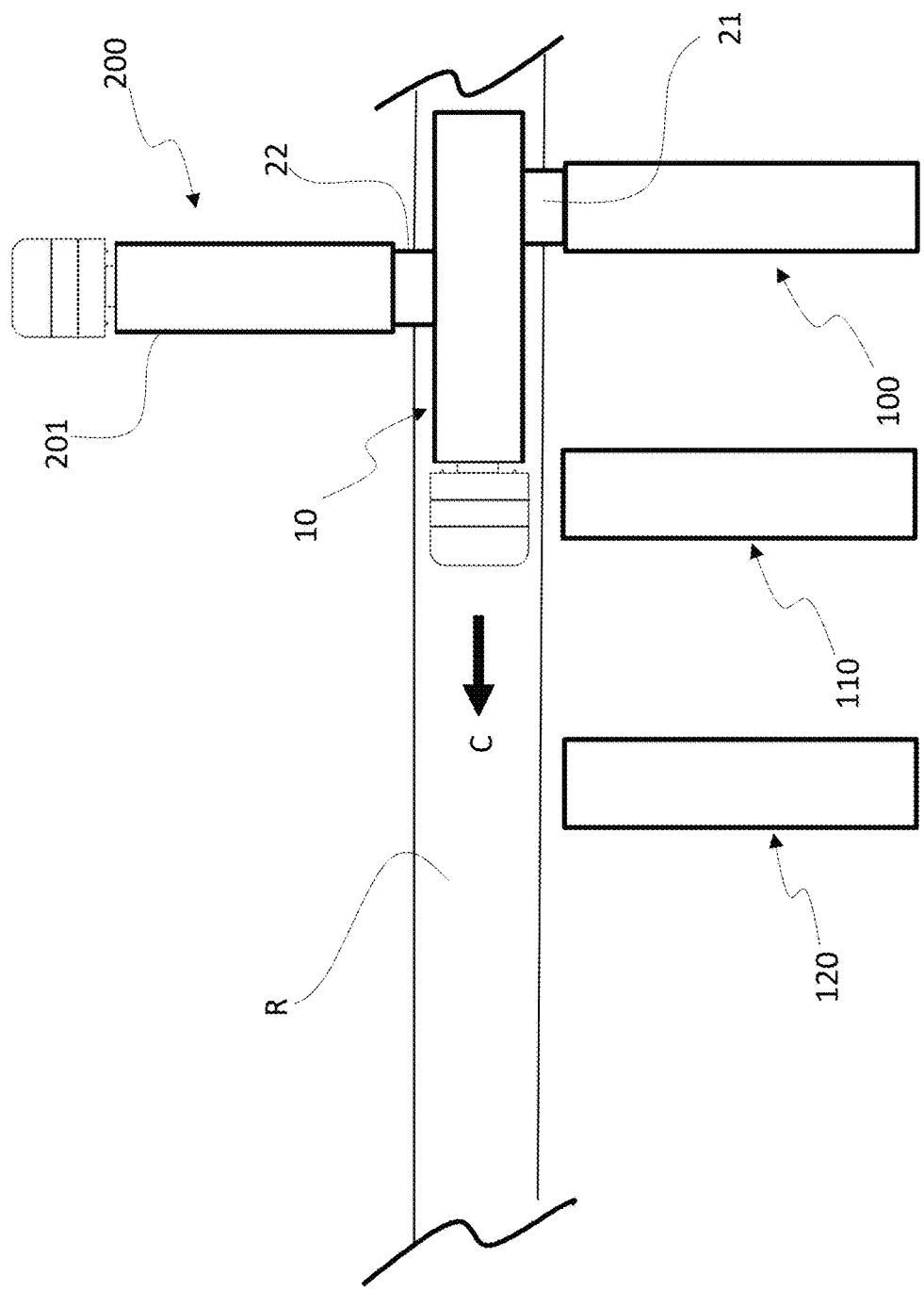
FIGS. 7A-7B show an alternative method of distributing freight between successive containers and one or more surface-road transports via the cross-dock of the present invention.
Figure 7B:
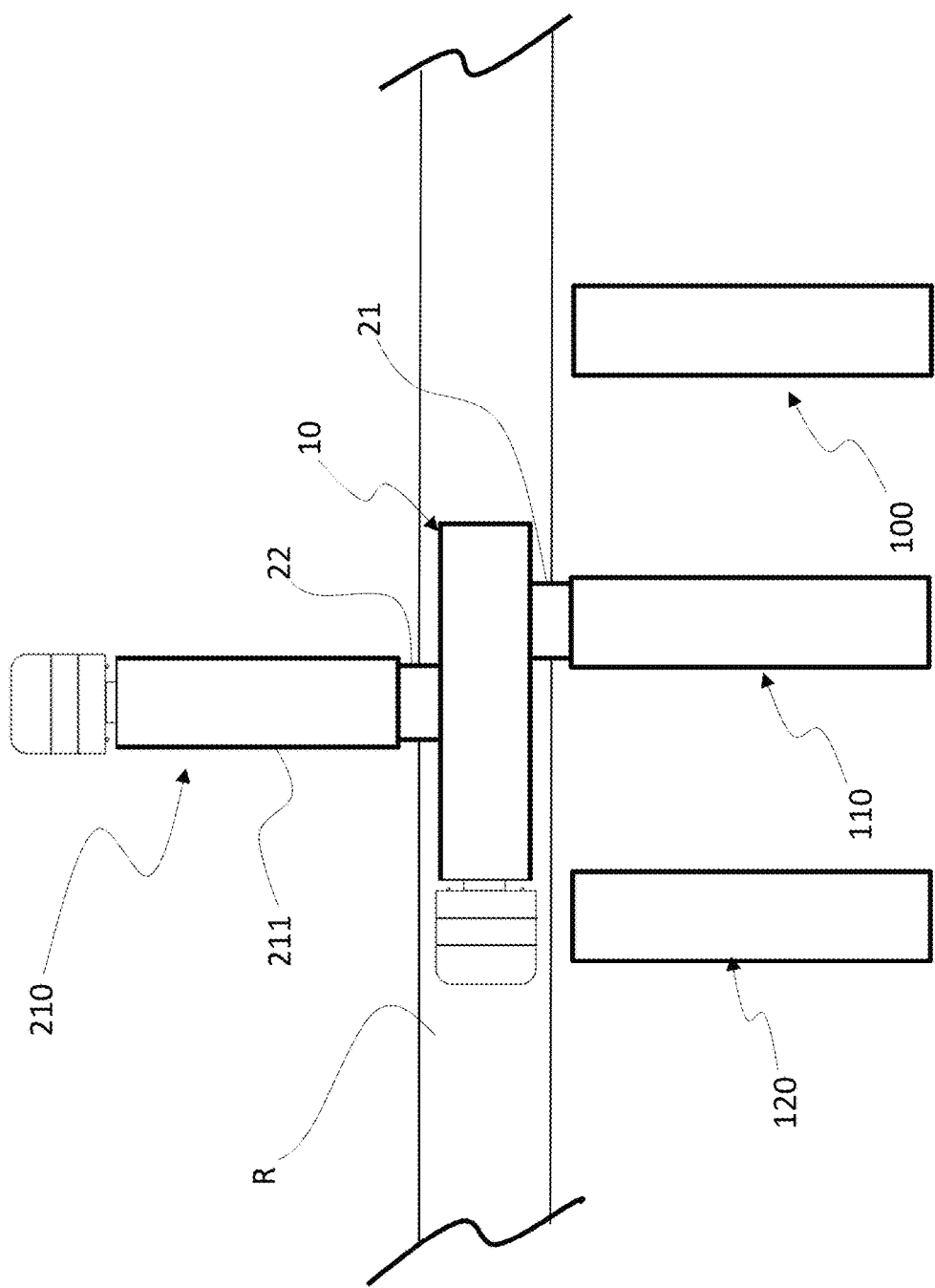

Referring next to FIGS. 7A-7B, it is also contemplated that the moveable cross-dock 10 may be positioned so as to be moveable relative to a plurality of coupled freight containers—including, for instance, the freight containers of a train, a plurality of adjacently-disposed intermodal shipping containers, etc.—thereby facilitating the more rapid distribution of freight from among several freight containers to one or more surface-road transports. To this end, the moveable cross-dock is positioned adjacent to a first freight container (in the illustrated embodiment, an intermodal shipping container) 100 and the opening 13 of the cross-dock 10 is aligned with a loading/unloading opening 101 of the intermodal shipping container 100. FIG. 7A. The access ramp 21 is connected to the intermodal shipping container so that it can bear load. As may be required, the retractable loading tunnel 31 is extended towards the opening of the intermodal shipping container and creates a seal around it.

Next, the freight container 201 of a surface-road transport 200 is aligned with the opening 14 and backed into position. The loading ramp 22 is then connected to the rear loading/unloading opening 202 of the freight container 201. As may be required, the retractable loading tunnel 32 is extended towards the opening of the freight container and creates a seal around it.

Once a desired amount of freight has been distributed between the intermodal shipping container 100 and the surface-road transport 200, the surface-road transport is moved away from the cross-dock 10. Next, the cross-dock 10 is moved (indicated by the arrow C) along a path parallel to the length of the train and into position proximate a second intermodal shipping container 110. The opening 13 of the cross-dock 10 is aligned with a loading/unloading opening 111 of the intermodal shipping container and the loading ramp 21 connected to the intermodal shipping container so that it can bear load. Again, as may be required, the retractable loading tunnel 31 is extended towards the opening of the intermodal shipping container and creates a seal around it. The same or another surface-road transport 210 is then aligned with the opening 13, backed into position, and the loading ramp 22 connected to the rear loading/unloading opening 212 of the freight container 211 so that freight from the second intermodal shipping container 110 may be distributed to the freight container 211 of the surface-road transport 210.

By continuing to move the cross-dock 10 relative to the several intermodal shipping containers (or vice-versa), the foregoing process may be repeated with a third 120 and subsequent intermodal shipping containers as necessary or desired.

Movement of the cross-dock may be facilitated by the provision of a paved service road R (FIGS. 7A-7B) running parallel to the intermodal shipping containers or, where the freight containers comprise rail-borne freight containers, the cross-dock may be provided with rail wheels and the path of travel parallel to the train may be defined by railroad tracks disposed in parallel to the tracks on which the train is disposed.

The use of the moveable cross-dock of the present invention has a number of advantages over conventional depot loading and unloading. Particularly where the freight containers comprise intermodal freight containers, the full weight capacity of each intermodal shipping container can be utilized for ship and/or rail travel (which is typically the longest stretch of the shipping journey). This can realize from 25% to 50% increase in the freight load for the intermodal freight container as compared to conventional loading practices which, as noted elsewhere, may oblige intermodal freight containers to be under-loaded so that they are weight compliant with various restrictions on surface-road loads when it comes to the surface-road portion of the shipping journey. As each intermodal freight container can carry more freight, fewer intermodal freight containers need be employed to transport the same amount of freight via ship and/or rail.

Further, the moveable cross-dock of the present invention can be used to rejig the load of freight between surface-road transports or even the load within a freight container. This use of the moveable cross-dock as a temporary storage site can also reduce wait times as freight can be unloaded from a surface-road transport, allowing the surface-road transport to be taken from the rail yard, intermodal terminal, etc. and repurposed before the arrival of the freight container into which the freight is transferred from the moveable cross-dock where it is being stored.

Still further, the cross-dock of the present invention is moveable and, thus, can be redeployed at different locations—such as, by way of non-limiting example, different rail yards, shipyards or intermodal terminals—as needed.

Although various embodiments of the present invention have been described and illustrated, it will be apparent to those skilled in the art that numerous modifications and variations can be made without departing from the scope of the invention, as defined in the appended claims.

The invention in which an exclusive property or privilege is claimed is defined as follows:

1. A method of redistributing freight between freight containers, the method comprising:
- transporting a moveable cross-dock to a freight redistribution location via surface roads, the cross-dock having a plurality of surface road wheels, a body defining an interior storage area, and at least three openings in the body through which freight may be moved into and out of the interior storage area;
- positioning a loading/unloading opening of a first freight container so that the loading/unloading opening of the first freight container is proximate a first of the at least three openings in the moveable cross-dock;
- positioning a loading/unloading opening of a second freight container of a first surface-road transport proximate a second of the at least three openings in the moveable cross-dock;
- positioning a loading/unloading opening of a third freight container of a second surface-road transport proximate a third of the at least three openings in the moveable cross-dock while the loading/unloading openings of the first and second freight containers are proximate the first and second openings in the moveable cross-dock; and
- redistributing freight between the first freight container, the second freight container, and the third freight container via the at least three openings of the moveable cross-dock.

2. The method of claim 1, wherein the positioning of the loading/unloading opening of the first freight container proximate one of the at least three openings in the moveable cross-dock comprises moving the first freight container relative to the moveable cross-dock after transporting of the moveable cross-dock.

3. The method of claim 1, wherein the freight comprises perishable freight, and wherein the interior storage area of the moveable cross-dock body is a temperature-controlled storage area.

4. The method of claim 1, wherein the moveable cross-dock further comprises a loading tunnel surrounding each of the at least three openings, an end of each loading tunnel configured to be positioned adjacent the loading/unloading opening in one of the first, second, and third freight containers;
- wherein the positioning of the loading/unloading opening of the first freight container proximate the first of the at least three openings in the moveable cross-dock comprises positioning the loading/unloading opening in the first freight container in close proximity to the end of the loading tunnel surrounding the first opening of the moveable cross-dock;
- wherein the positioning of the loading/unloading opening of the second freight container proximate the second of the at least three openings in the moveable cross-dock comprises positioning the loading/unloading opening in the second freight container in close proximity to the end of the loading tunnel surrounding the second opening of the moveable cross-dock; and
- wherein the positioning of the loading/unloading opening of the third freight container proximate the third of the at least three openings in the moveable cross-dock comprises positioning the loading/unloading opening in the third freight container in close proximity to the end of the loading tunnel surrounding the third opening of the moveable cross-dock.

5. The method according to claim 1, further comprising:
moving the second freight container of the first surface-road transport away from the second opening of the moveable cross-dock after a desired amount of freight has been redistributed between the first, second, and third freight containers;
- positioning a fourth freight container of a third surface-road transport, so that a loading/unloading opening of the fourth freight container of the third surface-road transport is positioned proximate the second opening in the moveable cross-dock; and
- redistributing freight to the fourth freight container via the at least three openings of the moveable cross-dock.

6. A method according to claim 1, wherein the first freight container is an intermodal shipping container.

7. A method according to claim 6, wherein the loading/unloading opening of the first freight container is at a longitudinal end thereof, and wherein the first freight container extends perpendicularly away from the moveable cross-dock when the first freight container and the moveable cross-dock are positioned at the freight redistribution location.

8. A method according to claim 1, wherein the loading/unloading openings of the first freight container, the second freight container, and the third freight container are located at the longitudinal ends thereof respectively, and the at least three openings of the moveable cross-dock are dimensioned to generally correspond to the loading/unloading openings of the first freight container, the second freight container, and the third freight container.

9. A method according to claim 1, wherein the transporting comprises coupling the moveable cross-dock to a surface road vehicle, and wherein the surface road vehicle is driven to transport the moveable cross-dock.

10. A method of redistributing freight between freight containers, the method comprising:
- transporting a moveable cross-dock to a freight redistribution location via surface roads, the cross-dock having a plurality of surface road wheels, a body defining an interior storage area, and at least three openings in the body through which freight may be moved into and out of the interior storage area;
- moving a loading/unloading opening of a first freight container so that the loading/unloading opening of the first freight container is proximate a first of the at least three openings in the moveable cross-dock;
- moving a loading/unloading opening of a second freight container of a first surface-road transport proximate a second of the at least three openings in the moveable cross-dock;
- moving a loading/unloading opening of a third freight container of a second surface-road transport proximate a third of the at least three openings in the moveable cross-dock; and
- redistributing freight between the first freight container, the second freight container, and the third freight container via the at least three openings of the moveable cross-dock while the loading/unloading openings of the first, second, and third freight containers are proximate the first, second, and third openings in the moveable cross-dock.

11. The method according to claim 10, further comprising:
- moving the second freight container of the first surface-road transport away from the second opening of the moveable cross-dock after a desired amount of freight has been redistributed between the first, second, and third freight containers;
- moving a fourth freight container of a third surface-road transport so that a loading/unloading opening of the fourth freight container is positioned proximate the second opening in the moveable cross-dock; and
redistributing freight to the fourth freight container via the at least three openings of the moveable cross-dock.

\* \* \* \* \*